United States Patent [19]

Denda et al.

[11] 4,029,625

[45] June 14, 1977

[54] NON-PHASING CHLOROPRENE POLYMER ADHESIVE COMPOSITION AND PREPARATION THEREOF

[75] Inventors: Yasuaki Denda; Takashi Kadowaki; Michio Dohi, all of Omi, Japan

[73] Assignee: Denki Kagaku Kogyo Kabushiki Kaisha, Tokyo, Japan

[22] Filed: Aug. 27, 1975

[21] Appl. No.: 608,321

Related U.S. Application Data

[62] Division of Ser. No. 411,820, Nov. 1, 1973, Pat. No. 3,941,738.

[52] U.S. Cl. .................. 260/31.4 R; 260/31.2 T; 260/31.2 MR; 260/32.8 A; 260/33.6 A; 260/34.2; 260/38; 260/845
[51] Int. Cl.² ... C08K 5/02; C08K 5/10; C08L 61/10
[58] Field of Search .............. 260/845, 38, 31.2 T, 260/31.4 R, 33.2 R

[56] References Cited

UNITED STATES PATENTS

| | | | |
|---|---|---|---|
| 3,361,693 | 1/1968 | Geschwind | 260/29.3 |
| 3,394,099 | 7/1968 | Garrett | 260/38 |
| 3,410,818 | 11/1968 | Vurcick et al. | 260/29.3 |
| 3,595,821 | 7/1971 | Spector | 260/845 |
| 3,812,203 | 5/1974 | Kadowaki | 260/845 |
| 3,912,676 | 10/1975 | Brizzolara et al. | 260/845 |

FOREIGN PATENTS OR APPLICATIONS

| | | |
|---|---|---|
| 7,140,876 | 2/1971 | Japan |
| 1,232,077 | 5/1971 | United Kingdom |

OTHER PUBLICATIONS

Griffin, W. C., Encyclopedia of Chemical Technology, (1965), Interscience Publishers, vol. No. 8, pp. 127–137.

*Primary Examiner*—Murray Tillman
*Assistant Examiner*—Thurman K. Page
*Attorney, Agent, or Firm*—Oblon, Fisher, Spivak, McClelland & Maier

[57] ABSTRACT

Chloroprene or a mixture of chloroprene and a comonomer is polymerized by emulsion polymerization in the presence of an alkali metal or ammonium salt of an aliphatic substituted benzoic acid or a non-ionic polyoxyethylene ether or ester surfactant. The resulting chloroprene polymer is admixed with a solvent, a metal oxide and a thermosettable resin, e.g., an alkylphenolformaldehyde resin to yield a non-phasing adhesive composition.

6 Claims, No Drawings

NON-PHASING CHLOROPRENE POLYMER ADHESIVE COMPOSITION AND PREPARATION THEREOF

This is a division of application Ser. No. 411,820, filed Nov. 1, 1973, now U.S. Pat. No. 3,941,738.

BACKGROUND OF THE INVENTION

1. Field of the Invention

This invention relates to an improved non-phasing chloroprene polymer adhesive composition and preparation thereof.

2. Description of the Prior Art

Adhesive compositions comprising polychloroprene, metal oxide, an alkylphenol-formaldehyde resin and a solvent, having high adhesive strength are well known. These adhesive compositions are homogeneous and opaque when freshly prepared. However, when the adhesive compositions are stored for a long term, they have separated non-uniformly into an upper phase of transparent polychloroprene and the resin and a lower phase containing the sedimented metal oxide. When an inorganic filler is incorporated in the adhesive composition, the inorganic filler is sedimented together with the metal oxide. The phenomenon of separation into an upper phase and a lower phase is referred to as "phasing." When phasing of an adhesive composition occurs, the workability of a coating therefrom is low and a desirable adhesive strength cannot be obtained.

It is now believed that one reason for the phasing is that the polymerization of the chloroprene was conducted in the presence of a disproportionated rosin emulsifier.

A need exists, therefore, for a chloroprene adhesive which can be formed without use of a disporportionated rosin and hence will not phase.

SUMMARY OF THE INVENTION

Accordingly, it is one object of this invention to provide an adhesive composition which can be stored or maintained for a long term without phasing.

It is another object of the invention to provide a non-phasing chloroprene polymer adhesive composition having no disproportionated rosin emulsifier.

These and other objects of this invention as will hereinafter become more readily apparent can be attained by providing a non-phasing chloroprene polymer adhesive composition comprising a chloroprene polymer, a metal oxide, a thermosettable resin such as an alkylphenol-formaldehyde resin and a solvent wherein the chloroprene polymer is prepared by an emulsion polymerization in the presence of an emulsifier selected from alkali metal or ammonium salts of aliphatic substituted benzoic acids and non-ionic polyoxyethylene ether or ester type surfactants.

DETAILED DESCRIPTION OF THE PREFERRED EMBODIMENTS

The chloroprene polymer of polychloroprene or chloroprene copolymer used in the composition of the invention is prepared by emulsion polymerization of chloroprene or a mixture of chloroprene and comonomer copolymerizable with chloroprene using an alkali metal or an ammonium salt of an aliphatic substituted benzoic acid or a non-ionic polyoxyethylene ether or ester surfactant, as the specified emulsifier. The sodium, potassium or ammonium salt of aliphatic substituted benzoic acid is preferred.

Although it is possible to add an alkali metal or ammonium salt of aliphatic substituted benzoic acid, it is possible to add an aliphatic substituted benzoic acid and an alkali, separately, and to react them in situ in the polymerization of the chloroprene.

A suitable substitutuent on the benzoic acid is a $C_{4-8}$ alkyl group. Sodium salts of di-tert-butylbenzoic acid and mono-para-tert-butylbenzoic acid are especially preferred as the alkali metal or ammonium salt of an aliphatic substituted benzoic acid.

A preferred emulsifier is the salt prepared by adding para-t-butyl benzoic acid or di-t-butyl benzoic acid with alkali, e.g., sodium hydroxide to the polymerization system.

The non-ionic polyoxyethylene ether or ester surfactants can be polyoxyethylene alkyl ethers, such as polyoxyethylene lauryl ether, polyoxyethylenecetyl ether, polyoxyethylene stearyl ether, polyoxyethylene oleyl ether; polyoxyethylene alkylphenol ethers, such as polyoxyethylene octylphenol ether, polyoxyethylene nonylphenol ether; sorbitan aliphatic acid esters, polyoxyethylene sorbitan aliphatic acid esters such as sorbitan monolaurate, polyoxyethylene sorbitan monolaurate; polyoxyethylene acyl esters, such as polyoxyethylene laurate, polyoxyethylene stearate, polyoxyethylene oleate. Nonionic surfactants are generally characterized by their HLB (hydrophile-lyophile balance), and in this invention, suitable nonionic surfactants are those having an HLB number of 6–18.

$$= \frac{\text{molecular weight of hydrophilic units}}{\text{total molecular weight of surfactant}} \times \frac{100}{5}$$

$$= \frac{\text{molecular weight of hydrophilic units}}{\text{molecular weight of lipophilic unit} + \text{molecular weight of hydrophilic units}} \times \frac{100}{5}$$

$$= \text{hydrophilic units weight percent} \times \frac{1}{5}.$$

The amount of the alkali metal or ammonium salt of aliphatic substituted benzoic acid or a non-ionic polyoxyethylene ether or ester surfactant is at least 0.5 wt. parts, preferably 3–5 wt. parts to 100 wt. parts of the monomer.

When the emulsifier is less than 0.5 wt. part, a large amount of coagulated material is produced and the polymerization velocity is remarkably reduced. The desired degree of tackiness can thus not be imparted by using the resulting chloroprene polymer in an adhesive composition. In order to prevent the formation of a coagulated material during the polymerization or during storage, and to maintain good emulsion stability, it is preferable to add a sodium, potassium or ammonium salt of condensate of formaldehyde and naphthalenesulfonic acid as an additional dispersing agent. It is preferable to add 0.3 to 5 wt. parts of the sodium salt of a condensation product of formaldehyde-naphthalenesulfonic acid (Na condensate of formaldehyde-naphthalene sulfonate) to 100 parts of the monomer.

In this invention, the chloroprene can be polymerized alone or can be polymerized in admixture with up to 50 wt. % of another comonomer. Suitable such comonomers include, vinyl substituted aromatic compounds, such as styrene, vinyltoluene and vinylnaphthalene; acrylic acid, methacrylic acid and derivatives thereof, such as the esters or nitrile of acrylic acid or methacrylic acid, e.g., methyl methacrylate and acrylonitrile; conjugated diolefin compounds, such as 1,3-butadiene, isoprene, 2,3-dichloro-1,3-butadiene. The emulsion of the monomer can contain up to 2 wt. % of sulfur total monomer.

The emulsion polymerization of chloroprene or a mixture of chloroprene and comonomer can be preferred in the presence of any of a variety of suitable additives. For example, a suitable amount of a conventional chain transfer agent can be added whereby a sol polymer can be formed. The conventional chain transfer agents can be an alkylmercaptan, dialkyl xanthogene disulfide and iodoform, or the like. The polymerization temperature can be in the range of 0°-50° C, preferably 5°-15° C. The polymerization can be initiated and maintained by adding a suitable free radical catalyst. Typical such catalysts include the organic or inorganic peroxides, such as potassium persulfate, dibenzoylperoxide, hydrogen peroxide, and cumene hydroperoxide and azobisisobutylonitrile, or the like. The conversion of total monomer to polymer is preferably greater than 55%, and often greater than 60%. Conventional polymerization inhibitors can be used, such as t-butyl catechol and thiodiphenyl amine to stop polymerization.

The polymer can be separated from the latex by freeze-coagulating the latex to form a thin film and thereafter drying, or by drying with a drum drier. When chloroprene or a mixture of chloroprene and a comonomer is polymerized, using as the emulsifier a salt of an aliphatic substituted benzoic acid, it is possible to dry the product by either freeze-coagulation or in a drum drier. When a polyoxyethylene nonionic surfactant having HLB of less than 11 is used, it is possible to dry the product by either freeze-coagulation or in a drum drier. When a nonionic surfactant having an HLB of more than 11 is used, the emulsion will be too stable to freeze-coagulate, so that the polymer can be separated by washing with water. Accordingly, it is preferable to dry with a drum drier.

Freeze-coagulation is usually carried out in neutral or weak acidic pH range. For this purpose the pH of the latex can be adjusted by adding a weak acid, such as acetic acid.

Heat treatment of the resulting latex before separating the polymer is effective for improving the adhesive properties of the product, particularly high temperature adhesive strength. This treatment is carried out in a temperature range of 30°-80° C for a time such that the polymer solubility to solvent ratio is not changed. This effect is clearly apparent in the case of a nonionic surfactant. However, when a nonionic surfactant is used, the tack retention time of the adhesive composition will be less than that obtained when using an alkali metal or ammonium salt of an aliphatic substituted benzoic acid.

In the adhesive composition of this invention, a chloroprene polymer prepared by polymerizing in the presence of an alkali metal or ammonium salt of aliphatic substituted benzoic acid or a non-ionic polyoxyethylene ether or ester surfactant, should be used as the base polymer. The adhesive composition of this invention comprises the chloroprene polymer, a modified phenol resin, particularly alkylphenol-formaldehyde resin wherein alkyl refers to the presence of at least one lower alkyl substituent on the phenol, a metal oxide, particularly magnesium and/or zinc oxide and an organic solvent. It is possible to add an inorganic filler such as hydrated silica, antioxidant or other conventional additives. Usually, 5-100 wt. parts of the modified phenol resin and 1-50 wt. parts of the metal oxide are added to 100 wt. parts of the chloroprene polymer (including copolymer).

The solid content of the adhesive composition is usually in the range of 5-60%.

The modified phenol resin can be added to a polymer solution after preliminarily reacting the resin with the metal oxide, but can also be added directly to a polymer solution. The metal oxide is added by a roller or a Bambury mixer to the chloroprene polymer (including copolymer) or to the polymer solution, directly. Suitable organic solvents can be any of the various solvents or mixtures of solvents, in which the chloroprene polymer is soluble.

The adhesive compositions of this invention have substantially the same composition as conventional polychloroprene adhesive compositions, except that the chloroprene polymer is polymerized in the presence of the specific emulsifier. This results in the advantageous property that the adhesive compositions of this invention can be stored over long periods of time without phasing. As to adhesive properties, the adhesive compositions of this invention have desirable tack and high adhesive strength.

Having generally described the invention, a further understanding can be obtained by reference to certain specific Examples which are provided herein for purpose of illustration only and are not intended to be limiting in any manner. The parts and percentages shown in the Examples are percentages by weight.

The tests were performed by the following methods:

A. Phasing test

I. 435 parts of solvent, 30 parts of alkylphenol-formaldehyde resin and 4 parts of magnesia were mixed and shaken at room temperature for 24 hours.

II. 100 parts of the chloroprene polymer was kneaded (by a rubber mixing roller) with 2 parts of styrenated phenol. 4 parts of magnesia and 5 parts of zinc oxide were added to the chloroprene polymer.

The products (I) and (II) were mixed and stirred at room temperature to prepare an adhesive composition. The adhesive composition was weighed in a glass test tube having an inner diameter of 20 mm and a height of 200 mm, and was stored at 20°-25° C, whereby any separation to a transparent or opaque upper phase and an opaque solid lower phase, was observed.

The results are shown by the days required for forming a phasing or the sedimentation degree calculated by the following equation, from measurement of heights of the upper phase and the lower phase.

$$\text{Sedimentation degree} = \frac{\text{height of upper phase}}{\text{height of upper phase} + \text{height of lower phase}} \times 100$$

The alkylphenol-formaldehyde resins and the solvents used in the tests are as follows.

Alkylphenol-formaldehyde resin a. Alkylphenol-formaldehyde resin having melting point of 190°-220° F and specific gravity of 1.09-1.11.

b. Alkylphenol-formaldehyde resin having melting point of 145°-165° F and specific gravity of 1.05-1.15.

c. Alkylphenol-formaldehyde resin having melting point of 145°–165° F and specific gravity of 1.09.

Solvents:

I. Mixture of equal volume of toluene, n-hexane and ethyl acetate.
II. Mixture of equal volume of toluene, n-hexane and acetone.
III. Mixture of equal volume of toluene, ethyl acetate and methylethyl ketone.

The mixed solvents of I-III are known as solvents which facilitate polychloroprene adhesives phasing.

B. Measurement of adhesive strength at elevated temperature

A vulcanized rubber sheet having a thickness of 2mm was wiped with a cloth and methylethyl ketone and used as one substrate for the test of adhesive strength. The vulcanized rubber was prepared by kneading the following mixture with a roller-mill and vulcanizing the mixture with a vulcanization press at 141° C for 30 minutes.

| Vulcanized rubber | |
|---|---|
| Polychloroprene | 100 parts |
| Phenyl-β-naphthylamine | 1 part |
| MgO | 4 parts |
| ZnO | 5 parts |
| SRF carbon black | 30 parts |
| Ethylenethiourea | 0.35 part |

A plasticized polyvinylchloride sheet containing di-octylphthalate as a plasticizer was used as the other substrate after it was wiped with a cloth and methylethyl ketone and dried. After 20 minutes, a liquid primer for plasticized polyvinylchloride was coated on the polyvinylchloride substrate, to be used for the test of adhesive strength.

The size of both of the test pieces of vulcanized rubber and plasticized polyvinylchloride was 25mm × 150mm and the area of the surface coated with the adhesive composition was 25mm × 100mm.

100 parts of the following adhesive composition was admixed with 3 parts of 20% solution of triphenylmethane triisocyanate in methylenechloride, and the mixture was coated on the surface of the styrenated phenol substrates so as to be 100 g/m².

| Adhesive composition: | |
|---|---|
| Polychloroprene | 100 parts |
| Styrenated phenol | 2 parts |
| MgO | 4 parts |
| ZnO | 5 parts |
| Toluene | 333 parts |

The both coated substrates were adhered after 30 minutes of open time and the adhered substrates were pressed by a roller having a load of 4.5 kg for 5 strokes and were kept at room temperature for 3 hours.

The adhered substrates were preheated at 85° C for 15 minutes in a constant temperature oven and an adhesive strength required for peeling at 85° C was measured at 200 mm/min. of peeling speed by an Instron universal tension tester with a constant temperature oven.

The demonstrated strength is thus adhesive strength at elevated temperature.

C. Pot life measurement

The viscosity of a mixture of 100 parts of the following adhesive composition and 3 parts of 20% solution of triphenylmethane triisocyanate in methylenechloride, was measured at 25° C by a Brookfield viscosity meter. This is an initial viscosity. The pot life was measured by the time necessary for providing twice the initial viscosity.

| Adhesive composition: | |
|---|---|
| Polychloroprene | 100 parts |
| Styrenated phenol | 2 parts |
| MgO | 4 parts |
| ZnO | 5 parts |
| Toluene | 333 parts |

EXAMPLE 1

Into a 2 liter flask, equipped with a stirred and a reflux condenser, the chloroprene monomer mixture, shown in Table I, was charged, and an aqueous solution of 0.5% of potassium persulfate, and 0.05% of sodium anthraquinone-β-sulfonate as a polymerization catalyst, were added to the mixture, and the polymerization was performed at 10° C in nitrogen gas stream atmosphere.

An emulsion containing 0.01 part of phenothiazine, and 0.01 part of t-butyl catechol, was added to the reaction mixture, so as to stop the polymerization at a conversion of 70%. The unreacted monomer was removed under reduced pressure. 10% aqueous solution of acetic acid was added to the resulting alkaline emulsion to adjust to pH 7.0 and the polymer was separated by a freeze roll and dried.

The above adhesive composition was prepared by using the resulting polychloroprene and the phasing test was performed to measure a sedimentation degree.

As a reference, the process of Example 1 was followed except using 5.0 parts of disproportionated rosin acid instead of di-t-butyl benzoic acid (DTBBA).

The phasing test was performed by using the same adhesive composition. The results are shown in Tables II, III, and IV.

TABLE I

| | Polymerization of chloroprene (parts) | | | |
|---|---|---|---|---|
| | Example A | Example B | Example C | Ref. A |
| Chloroprene | 100 | 100 | 100 | 100 |
| n-Dodecylmercaptan | 0.22 | 0.13 | 0.13 | 0.13 |
| Di-t-butyl benzoic acid | 0.5 | 3.0 | 5.0 | — |
| Disproportionated rosin acid | — | — | — | 5.0 |
| Water | 150 | 150 | 150 | 150 |
| NaOH | 0.1 | 0.6 | 1.0 | 1.0 |
| Na condensate of formaldehyde-naphthalenesulfonate | 1.0 | 1.0 | 1.0 | 1.0 |
| $Na_2SO_3$ | 0.3 | 0.3 | 0.3 | 0.3 |

TABLE I-continued

| Polymerization of chloroprene (parts) | Example A | Example B | Example C | Ref. A |
|---|---|---|---|---|
| Polymerization period (min.) | 590 | 330 | 240 | 300 |
| Conversion (%) | 69.0 | 70.3 | 71.5 | 70.6 |
| Mooney viscosity ($MS_{2+2.5}$ at 100° C) | 56.5 | 48.0 | 50.5 | 50.0 |

TABLE II

Sedimentation degree (with the alkylphenol-formaldehyde resin a)

| Solvent | Days storing adhesive composition | Example A | Example B | Example C | Reference A |
|---|---|---|---|---|---|
| I | 5 | 0 | 0 | 0 | 6.7 |
|   | 20 | 0 | 0 | 0 | 27.5 |
|   | 40 | 0 | 0 | 0 | 51.4 |
| II | 5 | 0 | 0 | 0 | 31.6 |
|    | 20 | + | 0 | 0 | 61.5 |
|    | 40 | 5.0 | 0 | 0 | 71.0 |
| III | 5 | 0 | 0 | 0 | 23.3 |
|     | 20 | 0 | 0 | 0 | 51.5 |
|     | 40 | 0 | 0 | 0 | 67.5 |

+ : tendency of phasing

TABLE III

Sedimentation degree (with the alkylphenol-formaldehyde resin b)

| Solvent | Days storing adhesive composition | Example A | Example B | Example C | Reference A |
|---|---|---|---|---|---|
| I | 5 | 0 | 0 | 0 | + |
|   | 20 | 0 | 0 | 0 | 80.2 |
|   | 40 | 0 | 0 | 0 | 81.6 |
| II | 5 | 0 | 0 | 0 | + |
|    | 20 | 0 | 0 | 0 | 70.8 |
|    | 40 | 0 | 0 | 0 | 75.2 |
| III | 5 | 0 | 0 | 0 | + |
|     | 20 | 0 | 0 | 0 | 82.3 |
|     | 40 | 0 | 0 | 0 | 87.2 |

+ : tendency of phasing

TABLE IV

Sedimentation degree (with the alkylphenol-formaldehyde resin c)

| Solvent | Days storing adhesive composition | Example A | Example B | Example C | Reference A |
|---|---|---|---|---|---|
| I | 5 | 0 | 0 | 0 | 0 |
|   | 20 | 0 | 0 | 0 | 0 |
|   | 40 | 0 | 0 | 0 | 0 |
| II | 5 | 0 | 0 | 0 | 79.8 |
|    | 20 | 0 | 0 | 0 | 84.1 |
|    | 40 | 0 | 0 | 0 | 85.0 |
| III | 5 | 0 | 0 | 0 | 0 |
|     | 20 | 0 | 0 | 0 | 78.0 |
|     | 40 | 0 | 0 | 0 | 80.5 |

+ : tendency of phasing

EXAMPLE 2

In a 3 liter flask equipped with a stirrer and a reflux condenser, the chloroprene mixture shown in Table V was charged and an aqueous solution of 0.5% of potassium persulfate and 0.05% of sodium anthraquinone-β-sulfonate as a polymerization catalyst were added to the mixture and the polymerization was conducted at 10° C in nitrogen gas stream atmosphere.

An emulsion containing 0.01 part of phenothiazine and 0.01 part of t-butyl catechol was added to the reaction mixture so as to stop the polymerization at the conversion of 70%. The unreacted monomer was removed under a reduced pressure. 10% aqueous solution of acetic acid was added to the resulting alkaline emulsion to adjust pH 5.6 and the resulting polymer was separated by a freeze roll and dried.

The resulting chloroprene polymer had a Mooney viscosity of $MS_{2+2.5}$ (at 100° C) of 48.

TABLE V

| Formula | Weight (parts) |
|---|---|
| Chloroprene | 100 |
| para-t-butylbenzoic acid | 3 |
| n-dodecylmercaptan | 0.28 |
| Water | 150 |
| NaOH | 1.0 |
| Na condensate of formaldehyde-naphthalenesulfonate | 0.8 |
| $Na_2SO_3$ | 0.3 |

In accordance with Example 1, the adhesive composition was prepared by using chloroprene polymer, and the phasing test was performed and the sedimentation degree was measured. The adhesive strength at elevated temperature and the pot-life of the adhesive composition were also measured. The results are shown in Tables VI-IX.

EXAMPLE 3

The process of Example 2 was followed except adding 2 parts of tetraethylthiuram disulfide in an emulsion form to 100 parts of the polymer. The polymer had a Mooney viscosity of $MS_{2+2.5}$ (at 100° C) of 44 (measured by a small rotor). In accordance with Example 2 (except using the resulting chloroprene polymer), the phasing, the sedimentation degree, the adhesive strength and the pot-life of the adhesive composition were measured. The results are shown in Tables IV-IX. The results of Reference A of Example 1 are shown again in Tables VI-XI as a reference.

As is clear from the results of Tables VI-VIII, when para-t-butyl benzoic acid and alkali were used, effective inhibition of phasing of the adhesive composition was obtained and the pot-life was improved for application of bonding of both of plasticized type polyvinylchloride substrates or bonding of soft type polyvinylchloride substrates and other substrates, as compared with those adhesive composition prepared using a disproportionated rosin acid as an emulsifier in polymerization of chloroprene.

TABLE VI

Sedimentation degree (with the alkylphenol-formaldehyde resin a)

| Solvent | Days storing adhesive composition | Example 2 | Example 3 | Reference A |
|---|---|---|---|---|
| I | 5 | 0 | 0 | 6.7 |
|   | 20 | 0 | 0 | 27.5 |
|   | 40 | 0 | 0 | 51.4 |
| II | 5 | 0 | 0 | 31.6 |
|    | 20 | 0 | 0 | 61.5 |
|    | 40 | + | 0 | 71.0 |
|    | 5 | 0 | 0 | 23.3 |

TABLE VI-continued

Sedimentation degree (with the alkylphenol-formaldehyde resin a)

| Solvent | Days storing adhesive composition | Sample Example 2 | Sample Example 3 | Reference A |
|---|---|---|---|---|
| III | 20 | 0 | 0 | 51.5 |
|  | 40 | 0 | 0 | 67.5 |

+ : tendency of phasing

TABLE VII

Sedimentation degree (with the alkylphenol-formaldehyde resin b)

| Solvent | Days storing adhesive composition | Sample Example 2 | Sample Example 3 | Reference A |
|---|---|---|---|---|
| I | 5 | 0 | 0 | + |
|  | 20 | 0 | 0 | 80.2 |
|  | 40 | 0 | 0 | 81.6 |
| II | 5 | 0 | 0 | + |
|  | 20 | + | 0 | 70.8 |
|  | 40 | 8.2 | 0 | 75.2 |
| III | 5 | 0 | 0 | + |
|  | 20 | 0 | 0 | 82.3 |
|  | 40 | 0 | 0 | 87.2 |

+ : tendency of phasing

TABLE VIII

Sedimentation degree (with the alkylphenol-aldehyde resin c)

| Solvent | Days storing adhesive composition | Sample Example 2 | Sample Example 3 | Reference A |
|---|---|---|---|---|
| I | 5 | 0 | 0 | 0 |
|  | 20 | 0 | 0 | 0 |
|  | 40 | 0 | 0 | 0 |
| II | 5 | 0 | 0 | 79.8 |
|  | 20 | 0 | 0 | 84.1 |
|  | 40 | 0 | 0 | 85.0 |
| III | 5 | 0 | 0 | 0 |
|  | 20 | 0 | 0 | 78.0 |
|  | 40 | 0 | 0 | 80.5 |

TABLE IX

| Sample | Example 2 | Example 3 | Reference A |
|---|---|---|---|
| Adhesive strength (kg/2.5 cm) | 2.79 | 2.12 | 0.43 |
| Pot-life (min.) | 657 | 702 | 405 |

EXAMPLE 4

Polychloroprene latex was prepared by using the following aqueous emulsion system:
A. Monomer mixture
 Chloroprene: 100 parts
 Polyoxyethylene alkylphenol ether: 4 parts
 (HLB 9.5) n-dodecylmercaptan: 2.05 parts
B. Aqueous solution
 Pure water: 150 parts
 Na condensate of formaldehyde-naphthalene sulfonate: 0.8 part
 $NaHSO_3$: 0.5 part
C. Catalyst solution
 Potassium persulfate: 2 parts
 Na anthraquion-$\beta$-sulfonate: 0.5 part
 Pure water: 100 parts
Polymerization was conducted by mixing A and B at 10° C and adding C continuously so as to provide uniform polymerization velocity. 0.02 part of t-butyl catechol and 0.02 part of phenothiazine were added to the reaction mixture so as to stope the polymerization at a conversion of 70%. The unreacted monomer was removed under reduced pressure. The polychloroprene latex was heated at 70° C for 2 hours. The polychloroprene was separated by a freeze coagulation and was washed with water and was dried by a hot air dryer. The polymer had a Mooney viscosity $MS_{2+2.5}$ (at 100° C of 48 (measured by a small rotor).

EXAMPLE 5

The process of Example 4 was followed except using 1 part of polyoxyethylenealkylphenol ether (HLB 9.5) in the monomer mixture and 2.10 parts of diethyl xanthogen disulfide instead of n-dodecylmercaptan. The polymer had a Mooney viscosity of $MS_{2+2.5}$ (at 100° C) of 58. The phasing and the adhesive strength of the adhesive compositions using the polychloroprene of Examples 4 and 5 were measured.

As a reference, polychloroprene having a Mooney viscosity of $MS_{2+2.5}$ (at 100° C) of 53 was prepared by polymerizing chloroprene with 4 parts of disproportionated rosin acid (instead of polyoxyethylene alkylphenol ether) and 0.21 part of n-dodecylmercaptan and using 0.8 part of NaOH in aqueous solution, in accordance with Example 1. The result of the phasing test is shown in Table X.

TABLE X

| | | | Example 4 | Example 5 | Reference B |
|---|---|---|---|---|---|
| $MS_{2+2.5}$ (at 100° C) | | | 48 | 58 | 53 |
| Adhesive strength (kg/2.5 cm) | | | 1.13 | 1.62 | |
| Phasing | solvent | resin | | | |
| | I | a | ○ | ○ | 15 days |
| | II | b | ○ | ○ | 15 days |
| | III | a | ○ | ○ | 10 days |
| | III | b | ○ | ○ | 10 days |

○ : no phasing for 30 days

As is clear from Table X, no phasing was found for longer than 30 days when the polyoxyethylenealkylphenol ether was used for the polymerization of chloroprene, as compared with those compositions which used disproportionated rosin acid in the polymerization of chloroprene.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. In a non-phasing chloroprene polymer adhesive composition comprising:
 a. 100 parts by weight of a chloroprene polymer,
 b. 1–50 parts by weight of a metal oxide,
 c. 5–100 parts by weight of an alkylphenol-formaldehyde resin,
a,b, and c being admixed with an organic solvent so as to obtain a solids content of said adhesive composition of from 5–60%,
the improvement wherein said chloroprene polymer is prepared by the emulsion polymerization of chloroprene or a mixture of chloroprene and a comonomer in the presence of a non-ionic polyoxyethylene ether or ester surfactant.

2. The non-phasing chloroprene polymer adhesive composition according to claim 1, wherein the non-ionic polyoxyethylene ether or ester surfactant is polyoxyethylene alkyl ether, polyoxyethylene alkylphenol ether, polyoxyethylene sorbitan aliphatic acid ester or polyoxyethylene acyl ester.

3. In the preparation of a non-phasing chloroprene polymer adhesive composition comprising:
   a. 100 parts by weight of a chloroprene polymer,
   b. 1-50 parts by weight of a metal oxide,
   c. 5-100 parts by weight of an alkylphenol-formaldehyde resin, a, b and c being admixed with an organic solvent so as to obtain a solids content of said adhesive composition of from 5-60%, the improvement wherein said chloroprene polymer is prepared by the emulsion polymerization of chloroprene or a mixture of chloroprene and a comonomer in the presence of a non-ionic polyoxyethylene ether or ester surfactant.

4. The preparation of non-phasing chloroprene polymer adhesive composition according to claim 3, wherein a non-ionic polyoxyethylene ether or ester surfactant is polyoxyethylene alkyl ether, polyoxyethylene alkylphenol ether, polyoxyethylene sorbitan aliphatic acid ester or polyoxyethylene acyl ester.

5. The non-phasing chloroprene polymer adhesive composition according to claim 1, wherein the non-ionic polyoxyethylene alkyl or alkyl aryl ether or ester surfactant has an HLB number of 6-18.

6. The non-phasing chloroprene polymer adhesive composition according to claim 3, wherein the non-ionic polyoxyethylene ether or ester surfactant has an HLB number of 6-18.

* * * * *

UNITED STATES PATENT AND TRADEMARK OFFICE
CERTIFICATE OF CORRECTION

PATENT NO. : 4,029,625
DATED : June 14, 1977
INVENTOR(S) : Denda et al

It is certified that error appears in the above-identified patent and that said Letters Patent are hereby corrected as shown below:

On the cover sheet of U. S. Patent 4,029,625, in the left hand column, following the line numbered "[21]" insert the following:

--[30] Foreign Application Priority Data

November 2, 1972 Japan ....... 47-110018--.

*Signed and Sealed this*

*Twenty-fifth* Day of *October 1977*

[SEAL]

*Attest:*

RUTH C. MASON
*Attesting Officer*

LUTRELLE F. PARKER
*Acting Commissioner of Patents and Trademarks*